US005813007A

United States Patent [19]
Nielsen

[11] Patent Number: 5,813,007
[45] Date of Patent: Sep. 22, 1998

[54] AUTOMATIC UPDATES OF BOOKMARKS IN A CLIENT COMPUTER

[75] Inventor: Jakob Nielsen, Atherton, Calif.

[73] Assignee: Sun Microsystems, Inc., Mountain View, Calif.

[21] Appl. No.: 667,012

[22] Filed: Jun. 20, 1996

[51] Int. Cl.$^6$ ..................................................... G06F 17/30
[52] U.S. Cl. .............................. 707/10; 707/1; 707/104; 395/200.36; 395/200.48
[58] Field of Search ..................................... 707/203, 104, 707/10, 1; 395/200.48, 200.36

[56] References Cited

PUBLICATIONS

"An Internet Difference Engine and its Applications", Ball & Douglis. AT & T Bell Lab., COMPCON '96 IEEE Computer Society Int'l Conference, Feb. 1996.
"Internet search tools", Sheryl canter, PC Magazine, v15, n9, p. 207(4), May 1996.
"Netscape for Window 95 Announced", Newsbytes, pNEW08220030, Aug. 1995.
"Corel is wired over Internet Mania", PR Newswire, Ottawa, Canada, Nov. 1995.
"First Floor and Netscape announce shipping of Netscape SmartMarks", Business Wire, Mountain View, CA, Oct. 1995.
"First Floor Smart Notification Server", http//www.firstfloor.com/, Nov. 1997.
Document entitled "Hypertext Tranfer Protocol—HTPP/1.1", by Fielding, Frystyk, Berners–Lee, Gettys, and Mogul, HTTP Working Group, May 2, 1996, pp. 1–138.
Document entitled "LISTSERV User Guide EARN Association", Jul. 29, 1993, LISTSERV Guide of General Users, ftp://ftp.msstate.edu/docs/words–I/Net–Stuff/lists, (26 pages).
Chapter from the Nutshell Hanbdook entitled "Managing Internet Information Services", by Jerry Reek, 1994 by O'Reilly & Associates, Inc. htto://www.onlink.com/mediaserver/contrib/majord/omo/majordomo.ora.
Document entitled "Standard for ARPA Internet Text Messages", Aug. 13, 1982, David H. Croker, Dept. of Electrical Engineering, University of Delaware, http://www.cls.ohio-state.edu/htbln/rfc/rfc822 ht.
Document entitled "Uniform Resorce Locators (URL)", Network Working Group, Request for Comments 1738, Category: Standards Track, T. Berners–Lee, CERN, L. Masinter, Xerox Corporation, M. McCahill, University of Minnesota, Editors, Dec. 1994. (pp. 1–25). Date Unknown.
Document entitled "Instant HTML Web Pages", by Wayne Ause, Macmillian Computer Publishing, 1995, (17 pages).

*Primary Examiner*—Thomas G. Black
*Assistant Examiner*—Hosain T. Alam
*Attorney, Agent, or Firm*—Daniel B. Curtis

[57] ABSTRACT

Apparatus, methods, systems and computer program products are disclosed to provide automatic notification of sufficient changes in bookmarked information files. The invention provides a user of information access programs (such as WWW Browsers) to automatically be informed of changes in information files (such as WWW Web Pages) when the maintainer of the information file determines that a sufficient change has been made to the file.

30 Claims, 15 Drawing Sheets

500
Server's Notification Subscriber
DB
Data Record

510
Server's Contact DB
Data Record

AUTOMATIC UPDATES OF BOOKMARKS IN A CLIENT COMPUTER

BACKGROUND OF THE INVENTION

1. Field of the Invention

This invention relates to the field of information provider and information access apparatus such as World Wide Web (WWW) Server and Browser applications executing on a computer. Specifically, this invention is a new and useful method, apparatus, system and computer program product for automatically indicating when a bookmarked information file (such as a Web Page) has sufficiently changed.

2. Background

Electronic mail provides a quick and convenient way for computer users to communicate. A message originator initiates this communication by composing a message using a text editing program, providing the e-mail address of the intended recipient, and often by providing an indication of the content (subject matter) of the message by including text in a "subject" field. Then, using well-understood technology, the originator's mail system sends the message to the recipient's computer address. The recipient's computer receives the message and stores it in the recipient's inbox. The recipient eventually reads, deletes, responds to, or otherwise processes the message stored within the inbox by using any of a number of e-mail programs well known in the art.

The WWW is a massive HyperText system that a computer user accesses using an information access apparatus such as a WWW Browser computer application. The WWW Browser application communicates with information provider apparatus such as WWW Server computer applications to obtain information and services in the form of Web Pages. These Web Pages are identified by unique Universal Resource Locators (URL). Many WWW Browser applications provide a bookmark capability for storing URLs for user-selected Web Pages. This simplifies the user's future access to these bookmarked Web Pages.

Electronic Mail

Because e-mail messages travel across networks, they generally are constructed according to the *Standard for the Format of ARPA Internet Text Messages* specification (RFC822). This specification can be found on the WWW at address "http://www.cis.ohio-state.edu/htbin/rfc/rfc822.html". Messages formatted to the RFC822 standard have a header portion and an optional body portion that contains the text of the message. The header portion includes a number of fields that address and classify the message. The invention does not require the use of the RFC822 standard. So long as there exists a method to identify essential information the invention is applicable. However, the embodiment described herein uses the RFC822 protocol.

The header portion of an e-mail message contains fields composed of character strings comprising a field-name followed by a colon, followed by a field-body terminated by a carriage return/line feed. An example header field is:

"To: John Doe<CR><LF>"

In this example, the <CR> represents the ASCII carriage return character and the <LF> represents the ASCII line feed character. The header field-names are not case sensitive, thus, "to:" is equivalent to "TO:", "To:" or "tO:".

The originator, who composes the message, specifies the contents of many header fields. The "To:" field contains the addresses of the intended primary recipients of the message where the address of each recipient is separated by a comma. The "Cc:" field contains the addresses of the intended secondary recipients of the message (again each address is separated by a comma). The "Subject:" field often provides a summary, or indicates the nature, of the message. Although the originator initializes all these fields as desired, the contents of the recipient fields are generally required to be actual Internet addresses. On the other hand, the Subject: field has no specific meaning and may, in fact, be blank, contain a command, or contain a random arrangement of characters. Often the Subject: field contains a short title representative of the message's subject matter. However, this header field can be used to carry substantive information such as a command, or data that can be operated on by a command.

A single e-mail message can be sent to multiple recipients. This capability has evolved to the distribution list concept. A distribution list is generally directed towards a particular subject matter (for example, the copyright list "cni-copyright@cni.org"). Thus, those who are interested in the subject matter "subscribe" to the distribution list. Subscribers have their e-mail address added to the list of recipients for messages sent from the distribution list. Thus, when the distribution list receives a message it redistributes the message, using normal e-mail, to all the subscribers (recipients) of the distribution list. Distribution lists can be managed directly by some human agency, a program (a listserver), or a combination of both. Some distribution lists are moderated in the sense that a human reviews all incoming messages prior to reposting them through the distribution list. Other distribution lists are not moderated. Thus, messages received by the unmoderated group are automatically redistributed to the rest of the subscribers without human review.

List Server Applications

The "majordomo" and "listserv" applications are two of the more popular listserver applications. The listserv application is described in the *LISTSERV User Guide*, 1993, ISBN 2-910286-02-9, © 1993 by EARN Association. This document is available on the Internet at "ftp://ftp.msstate.edu/docs/words-l/Net-Stuff/listserv.guide". The majordomo application is described in a chapter of *Managing Internet Information Services*, by Jerry Peek, © 1994 by O'Reilly & Associates, Inc., ISBN 1-56592-062-7.

World Wide Web

The background of the World Wide Web (WWW), WWW Browser applications, and Uniform Resource Locators (URL) are well described by reference to the first chapter of *Instant HTML Web Pages*, by Wayne Ause, Ziff-Davis Press, ISBN 1-56276-363-6, copyright 1995, pages 1–15, hereby incorporated by reference as illustrative of the prior art. The URL specification, also incorporated by reference, is described in RFC1738 and can be found on the WWW at: "http://www.cis.ohio-state.edu/htbin/rfc/rfc1738.html".

Although the invention applies to information access and information provider apparatus, WWW Browser and WWW Server applications are representative of the technology. As such, this application describes the invention within the context of a preferred embodiment utilizing WWW Browser and WWW Server applications.

A WWW Browser application communicates with a WWW Server application using the HyperText Transfer Protocol (HTTP). The HTTP/1.0 protocol is described in RFC1945 and can be found on the WWW at: "http://www.cis.ohio-state.edu/htbin/rfc/rfc1945.html" and the HTTP/1.1 draft document of Jan. 19, 1996 are incorporated by reference as illustrative of the prior art.

As mentioned above, the WWW is a massive HyperText system. Thus the information provided to a user often includes references to other related information. These references are via HyperText links. Activating these HyperText links often results in accessing completely different Web Pages (supplied from completely different WWW Server applications on other computer systems) from the Web Page that contains the link. Thus, a user often follows many links to reach a desired information or service. One difficulty when traversing these links is that the user often loses track of the sequence of links used to arrive at a particular Web Page. Thus, the user has difficulty returning to a Web Page of interest. A bookmark facility addresses this problem by providing a mechanism to store and recall specific Web Pages of interest. Each bookmark comprises the title of the Web Page and the URL used to access the Web Page. Additionally bookmarks often contain the date the Web Page was last visited, and the date the Web Page was bookmarked along with additional information.

One problem with the WWW is that although the contents of any given Web Page is often sufficiently changed, interested users are not informed of the change. Thus, the information provided by an older Web Page becomes out-of-date without the user's knowledge. One approach to address this problem is to associate a distribution list with a Web Page. Using this approach, the maintainer of the Web Page sends a message to the distribution list whenever the maintainer determines that the Web Page has sufficiently changed. Thus, all the subscribers to the distribution list receive a notice of the change. However, these e-mail messages are delivered to the recipients e-mail inbox and are often disposed of without being acted on. Further, these messages are only a one-time reminder of the change. Thus, once notified, the user often forgets to actually view the modified Web Page.

The person who maintains the Web Page subjectively decides whether changes to the Web Page are sufficient to inform notification subscribers of the changes. Thus, changes to correct typographical errors often would not be sufficient to initiate notification even if significant modifications were made to the Web Page.

Another approach to this problem is illustrated by WWW Browser capabilities such as the "What's New" command of the Netscape® Browser. This command causes the WWW Browser application to query bookmarked Web Pages to determine which Web Pages have been changed since the last time the user viewed the Web Page. This command generally causes the WWW Browser application to send an HTTP HEAD method request to the URL specifying the Web Page. The WWW Server application then responds with the metainformation associated with the specified Web Page. This metainformation includes the "Last-Modified:" entity-header field. This entity-header field contains the date and time of the most recent modification to the Web Page. If this date and time is more recent than the date and time of the last access of the page (as stored in the bookmark) the bookmark is modified to indicate that the underlying Web Page has been modified since last examined. One skilled in the art will understand that other prior art approaches exist that differ from the use of the HEAD method request described above.

The "What's New" approach to finding modified Web Pages has the following disadvantages:

The user must explicitly invoke the command to initiate the Web Page check. Thus, the information that the Web Page has changed is not presented to the user when the change occurs, but only after the user invokes the query.

The definition of a changed Web Page is very simplistic. Any modification—such as a single character spelling error correction will flag the Web Page as being changed.

Finally, the search for modified Web Pages often takes a significant amount of time. This problem is particularly acute when a large number of Web Pages have been bookmarked. This delay often precludes frequent use of the "What's New" method.

The invention addresses these problems and simplifies a recipient's use of the bookmark facility by providing a mechanism for automatically indicating when bookmarked information has been sufficiently changed.

SUMMARY OF THE INVENTION

The present invention overcomes the disadvantages of the above described systems and provides an economical, apparatus, method, system and computer program product for providing enhanced facilities to users of information access applications. One aspect of the invention is a computer controlled method for automatically indicating when an information file has sufficiently changed. The information file is provided to an information access apparatus that has a bookmark mechanism. The bookmark mechanism stores the information file specification. The method sends a subscription message to a notification mechanism and receives a notification message, from the notification mechanism, providing notice that the information file has sufficiently changed. The method then indicates the fact that the information file has sufficiently changed.

Another aspect of the invention discloses an information access system that includes a bookmark mechanism to store an information file specification. The system also includes a subscription mechanism that sends a subscription message to a notification mechanism. This subscription message contains an information file specification. The system also includes a notification message receiver mechanism that receives a notification message that provides notice that the information file that corresponds to the information file specification has sufficiently changed. The system includes an indication mechanism to indicate that the information file has sufficiently changed.

In yet another aspect of the invention discloses an information access apparatus for accessing an information file. This apparatus includes a central processing unit, memory, a network interface that provides access to a network, and a display device. This apparatus also utilizes a bookmark mechanism to store information file specifications of information files. The apparatus includes a subscription mechanism that sends a subscription message to a notification mechanism. The subscription message contains an information file specification. The apparatus also includes a notification message receiver mechanism that receives a notification message. The notification message provides notice that the information file corresponding to the information file specification has sufficiently changed. The apparatus also includes an indication mechanism that indicates that the information file has sufficiently changed.

In another aspect of the invention a computer program product is disclosed consisting of a computer usable storage medium that has computer readable code embodied within that causes an information file to be accessed. The computer readable code, when executed on a computer causes a computer to effect an information access apparatus that provides an indication when a subscribed-to bookmarked information file has sufficiently changed.

The invention also discloses an information provider apparatus that provides an information file. This apparatus includes a central processing unit, a memory and a network interface that provides access to a network. The apparatus also includes a first receiving mechanism that receives a subscription message that contains an information file specification that specifies which information file to monitor for sufficient change. The apparatus also includes a database mechanism that stores the information file specification and a sending mechanism that sends a notification message when the information file sufficiently changes.

A final aspect of the invention discloses a computer program product having computer readable code embodied in a computer usable storage medium. When executed on a computer the computer readable code provides an information files corresponding to an information file specification. The product also causes the computer to effect a receiving mechanism to receive a subscription message that contains the information file specification. This information file specification is added to a database by a database mechanism. Further, the product causes the computer to effect a sending mechanism that sends a notification message when an information file sufficiently changes

DESCRIPTION OF THE DRAWINGS

The objects, features and advantages of the system of the present invention will be apparent from the following description in which.

NOTATIONS AND NOMENCLATURE

Figure 1:
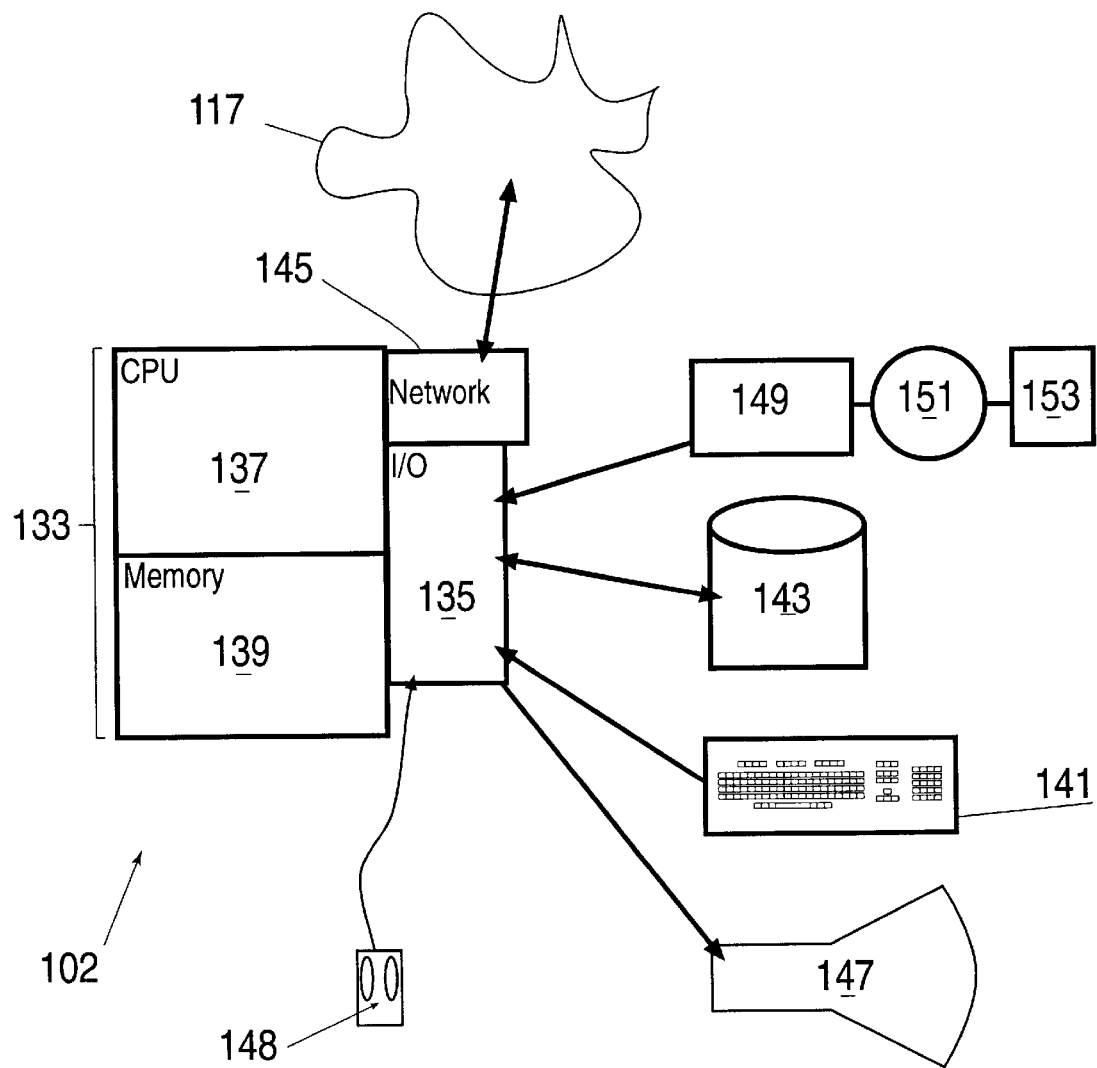
FIG. 1 illustrates a portion of a computer, including a CPU and a conventional memory in which the present invention may be embodied.

Distribution list—An e-mail recipient that receives e-mail and forwards that e-mail to subscribers to the distribution list. A computer application called a listserver often manages a distribution list. A distribution list is often termed a mailing list.

E-mail system—An electronic mail system being a system of computers generally connected by a network that allow an originator (being a user of, or an application program in a first computer) to compose and send data making up a message to a recipient (being a user of, or an application program in, either the first computer or of a second computer).

Graphical User Interface (GUI)—A user interface that allows a user to interact with a computer display by pointing at selectable control areas on the display and activating a command or computer operation associated with the selectable control area. GUIs are well known in the art.

Inbox—an area on a filestorage used by an e-mail system to store e-mail messages that have not been viewed by a recipient.

Information Access Application—A computer application that provides a computer user with access to information supplied by an Information Provider Application. Typical Information Access Applications would include WWW Browser, FTP, Gopher, and similar applications.

Information File—A file containing information that is provided to a computer user when an Information Access Application communicates with an Information Provider Application to present the information contained in the Information File to the user of the Information Access Application.

Information Provider Application—A computer application that provides an Information Access Application with access to Information Files. A typical Information Provider Application would be a WWW server application.

Listserver—An automated mailing list management application program that, in response to e-mail messages addressed to the listserver, causes a computer to maintain a recipient database of recipients who will receive copies of e-mail messages sent to the distribution list serviced by the listserver.

Originator—A computer user or computer application program that composes an e-mail message and presents the message to the computer's e-mail system for transmission to one or more recipients.

Pointing device—A device that is responsive to a computer user's input that moves an indicator on a computer display screen. Such an indicator has an active point such that if the pointing device is activated (for example, by a button push for a mouse device) a command associated with the selectable control area covered by the active point is invoked. Graphical User Interfaces generally use pointing devices.

Recipient—A computer user or computer application program having an e-mail address where an originator can send an e-mail message.

Selectable control area—An area on a computer display that is sensitive to activation of a pointing device. Activation of the pointing device over the selectable control area invokes a command or computer operation associated with the selectable control area. Most computer systems that provide a Graphical User Interface (GUI) also provide other methods for invoking these commands or computer operations such as keyboard function keys or command lines.

Sufficient Change—A change to an Information file that is of interest to a user who bookmarked the Information file. Generally even correction of extensive spelling errors would not be a sufficient change no mater how significant the change may have been. However, addition, modification, or deletion of content from a Web Page would often be sufficient. Sufficiency is determined by the maintainer of a Web Page taking into account the relevancy of any change to the Web Page to those who have subscribed to the notification service of the invention.

Text String—Ordered computer data in a computer that represents text. One common representation of a text string is a sequence of eight bit bytes each containing an ASCII representation of a character. Such a sequence is often terminated by a byte whose value is zero or by having a leading value indicate the length of the string. One skilled in the art will understand that there exist many methods for storing text strings beyond the ones mentioned here.

User—A human who uses a computer.

Web Page—generally a subset of Internet resources. As used in this application, a Web Page is identical to the resource described in the HTTP protocol. That is: A network data object or service which can be identified by a Universal Resource Locator (URL).

Window—an area, usually rectangular, on a computer display screen controlled by an application.

A procedure is a self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols characters, terms, numbers, or the like. It will be understood by those skilled in the art that all of these and similar terms are associated with the appropriate physical quantities and are merely convenient labels applied to these quantities.

The manipulations performed by a computer in executing opcodes are often referred to in terms, such as adding or comparing, that are commonly associated with mental operations performed by a human operator. No such capability of a human operator is necessary in any of the operations described herein that form part of the present invention; the operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description below.

Finally, the invention may be embodied in a computer readable storage medium encoded with a program for notifying a user of an information access apparatus when a bookmarked Web Page has sufficiently changed.

DESCRIPTION OF THE PREFERRED EMBODIMENTS

Operating Environment

Some of the elements of a computer system 102 configured to support an e-mail system is shown in FIG. 1 wherein a processor 133 is shown, having an Input/Output ("I/O") section 135, a central processing unit ("CPU") 137 and a memory section 139. The I/O section 135 is connected to a keyboard 141, a disk storage unit 143, a network interface 145 to provide access to a network 117, a display unit 147, a pointing device 148 and a CD-ROM drive unit 149. The CD-ROM unit 149 can read a CD-ROM storage medium 151 that typically contains programs and data 153. The CD-ROM 149 and the disk storage unit 143 comprise a filestorage mechanism. One skilled in the art will understand that the filestorage mechanism may comprise read only memory, RAM or other storage technology that allows a computer to access data. Such a computer system is capable of executing applications that embody the invention.

Figure 2:
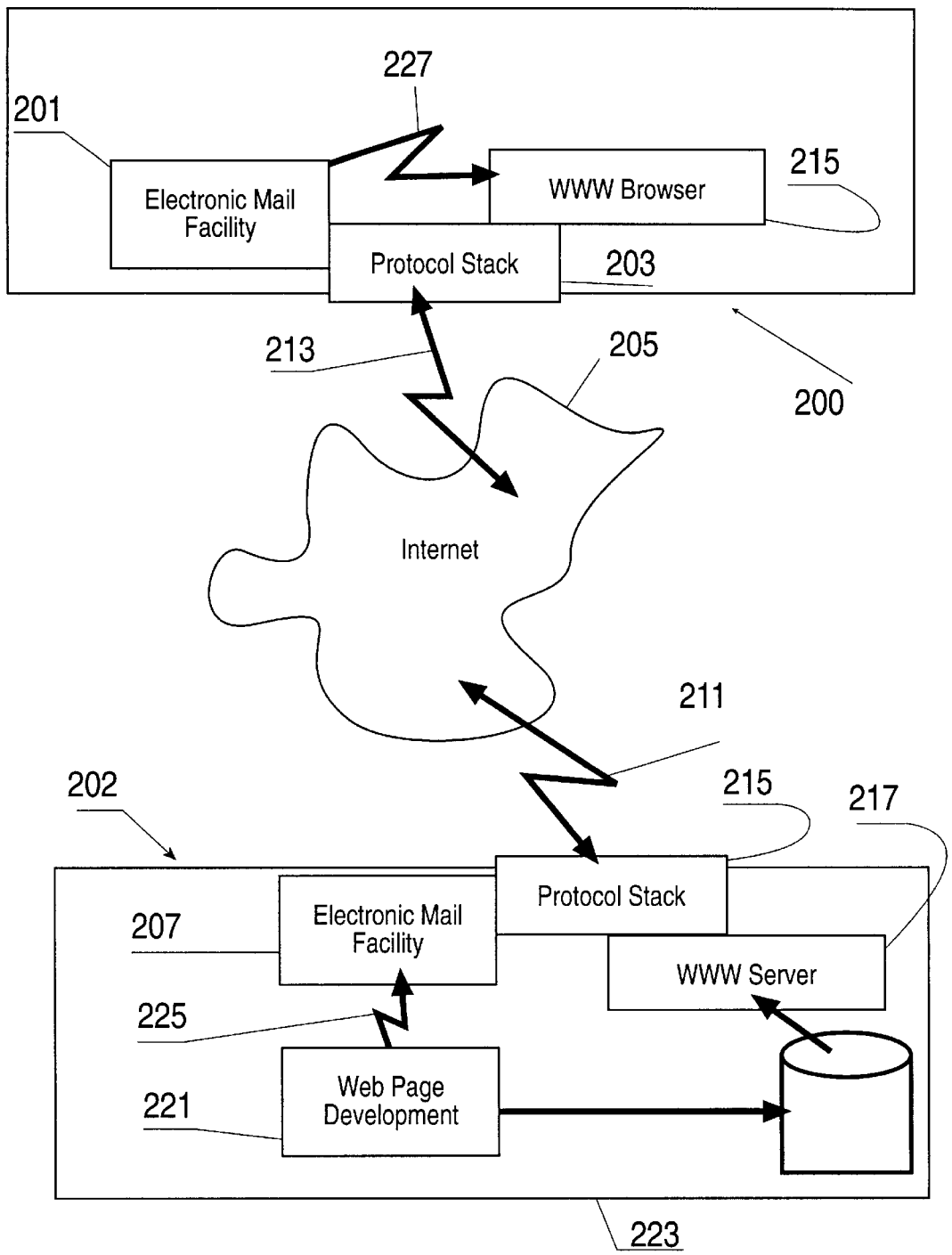
FIG. 2 illustrates the cooperation of the e-mail and WWW Server and browser applications in accordance with a preferred embodiment.

FIG. 2 illustrates how a plurality of computers, encompassing the configuration described in FIG. 1, implement e-mail and WWW processing in the Internet environment. In the e-mail situation, a sender creates a message using an e-mail facility 201 within the originator's computer 200. Once the e-mail message is created, it is encapsulated by an Internet protocol stack 203 that passes the encapsulated e-mail to the Internet 205 as indicated by the arrow labeled as 213. The Internet 205 routes the e-mail to the recipient's computer 202, as indicated by the arrow labeled as 211, where the message is extracted from the encapsulating protocol by a protocol stack 215 and received by the recipient's e-mail facility 207.

FIG. 2 also illustrates fundamental characteristics of the WWW. An information provider apparatus 202 (generally a computer executing a WWW Server application 217) provides access to information on request by an information access apparatus 200 (generally a computer executing a WWW Browser application 215). The WWW Server 217 and WWW Browser applications 215 generally open a reliable communication channel 213, 211 over the Internet 205 using an error correcting Internet protocol such as TCP/IP. Once the connection between the WWW Server application 217 and the WWW Browser application 215 is established, the applications communicate using a HyperText Transfer Protocol (HTTP). The WWW Server application 217 generally responds to commands from the WWW Browser application 215 to provide services and information (data) from a filestorage 223 to the WWW Browser application 215. One skilled in the art will understand that both the WWW Server application 217 and the WWW Browser application 215 can be executing on the same computer and that the TCP/IP connections 213, 211 between the applications need not actually be made across the Internet 205.

Further, a maintainer of a Web Page generally uses a Web Page Development facility 221 to construct and maintain Web Pages on the filestorage 223. Such a development facility 221, using the invention, directly or indirectly provides the Web Page maintainer with the ability, described below, to designate when a sufficient change has been made to a Web Page.

Additionally, FIG. 2 also illustrates interprocess communications between application programs executing on the same computer. These interprocess communication links 227, 225 are used to pass information from one application program to another. Examples of these types of links are SUN's ToolTalk, Apple's AppleScript, Microsoft's OLE, TCP/IP or some operating system supported interprocess communication method. Here, the Web Page Development facility 221 communicates using the interprocess communication link 225 to the e-mail facility 207 on the Server computer 202 when the maintainer of a Web Page determines that the Web Page has been sufficiently modified. This communication causes an e-mail message to be directed to a subscribing WWW Browser application 215 indicating that the Web Page has sufficiently changed. The e-mail facility 201 resident in the computer 200 hosting the subscribing WWW Browser application 215 receives this e-mail message and notifies the WWW Browser application 215 vie the interprocess communication link 227.

Figure 3:
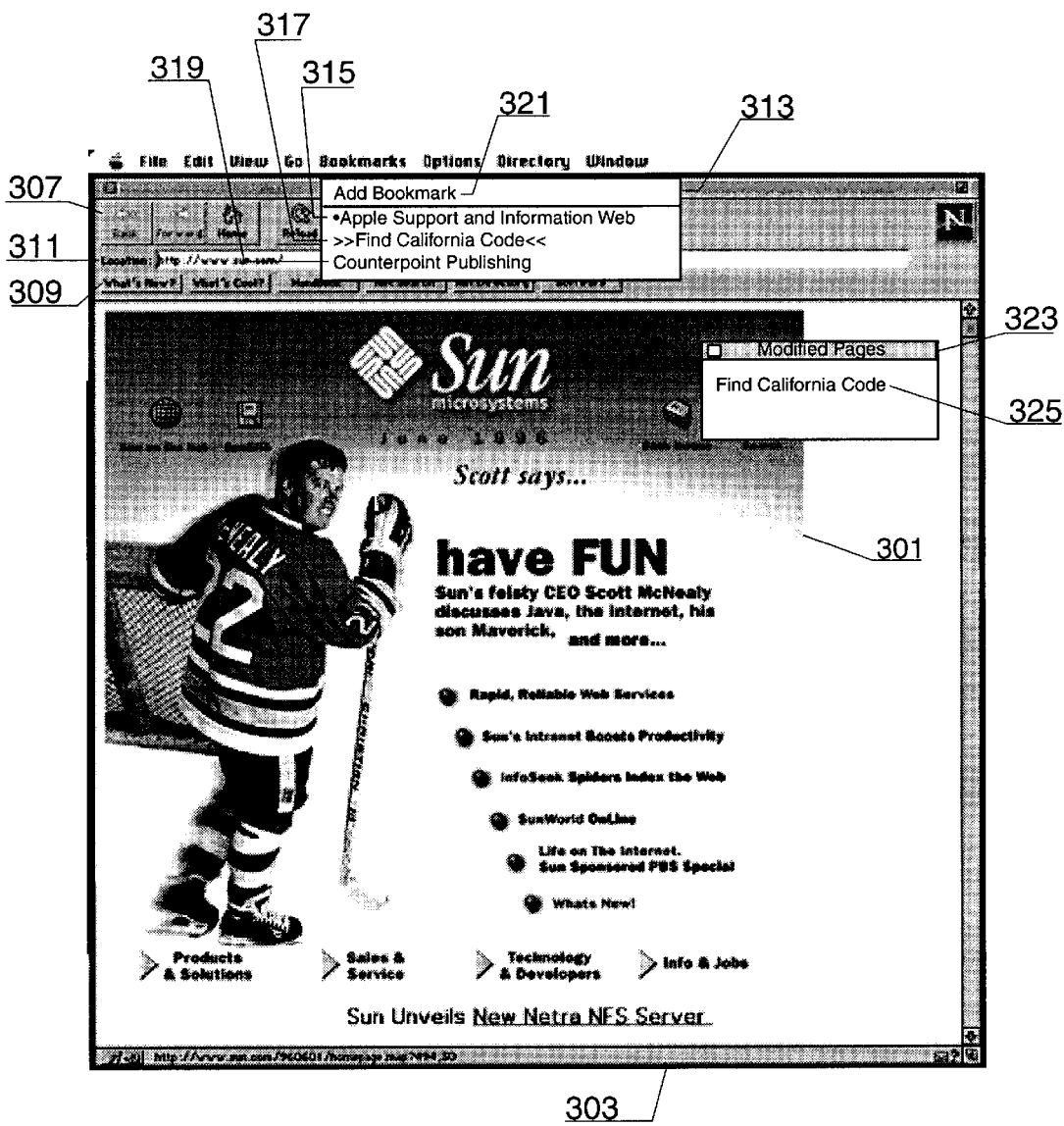
FIG. 3 is a scanned image that illustrates a sample Web Page display along with bookmarked Web Pages in accordance with a preferred embodiment.

FIG. 3 illustrates a Web Page provided by a WWW Server apparatus 202 executing a WWW Server application 217 as viewed on a display device 147 using a WWW Browser application 215. This particular WWW Browser application 215 is provided by Netscape Communications, Inc. This Netscape browser application is one of many possible WWW Browser applications that would be improved by incorporating the invention therein. The Web Page information 301 is displayed in a window 303 by the WWW Browser application 215. This WWW Browser application 215 provides operator command buttons 307, WWW navigation buttons 309, and presents the URL for the currently displayed Web Page 311. This Figure shows the bookmark popup 313. This popup 313 displays the titles of current bookmarked Web Pages 315, 317, 319 along with a menu command 321 used to bookmark the current page 301. The bookmark labeled as 319 is the prior art method of displaying the bookmark. The bookmark labeled as 315 indicates, by the "•" prefix, that the bookmark has changed as discovered by the "What's New" command. The prior art does not provide this capability. Finally, the bookmark labeled as 317 indicates, by enclosing the Web Page title within ">>" and "<<" that the Web Page has sufficiently changed and that the Web Page has not be subsequently viewed. A preferred embodiment of the invention also provides the capability of supporting a floating window 323 used to list only the titles of the Web Pages 325 that have received notification of sufficient change but that have not been subsequently viewed.

Figure 4:
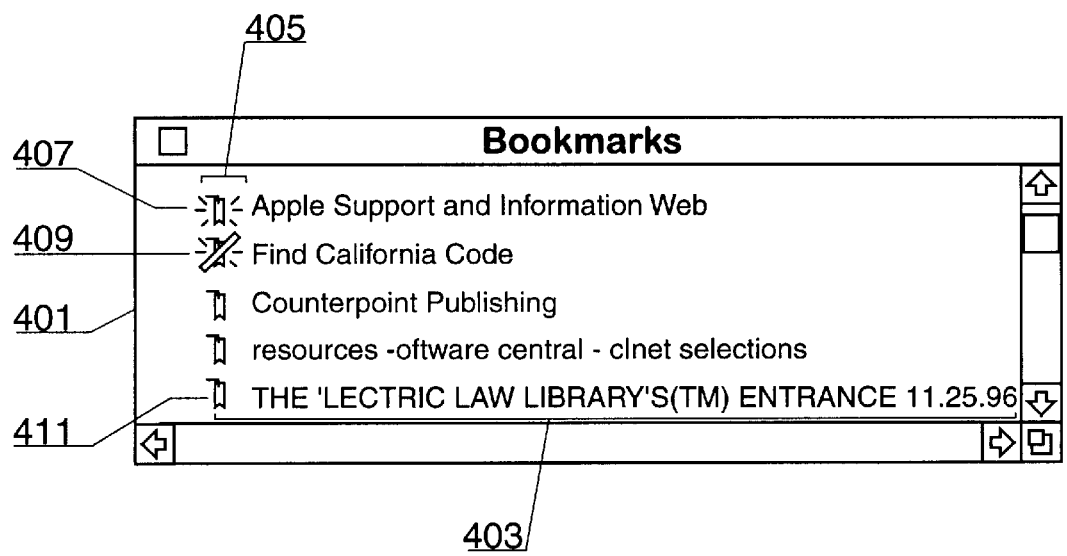
FIG. 4 illustrates a window displaying bookmarked Web Pages in accordance with a preferred embodiment.

Most WWW Browser applications also provide a bookmark management facility. The Netscape browser provides a bookmark window that allows a user to organize the bookmarks. FIG. 4 illustrates a typical bookmark window 401 listing a number of bookmarked Web Page titles 403, each with an associated status icon 405. Status icons like the one labeled as 411 indicate that the Web Page has either not been modified or that the "What's New" process has not been applied to the bookmark. Web Pages that have changed and detected by the "What's New" process are marked by an icon such as the one labeled as 407. Web Pages that have been sufficiently changed and for which the WWW Browser application has automatically received notification of the change but that have not been viewed since the notification are marked with an icon such as the one labeled as 409. One skilled in the art will understand that there a many equivalent ways to organize this window 401 and many equivalent ways to indicate the status of each bookmark.

Databases used with a Preferred Embodiment of the Invention

Figure 5:
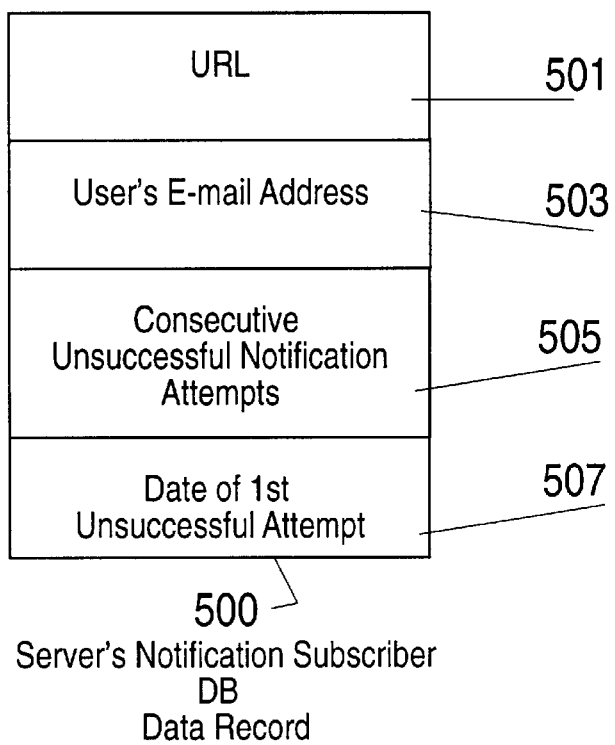
FIG. 5 illustrates record formats for the databases used in accordance with a preferred embodiment.
Figure 5:
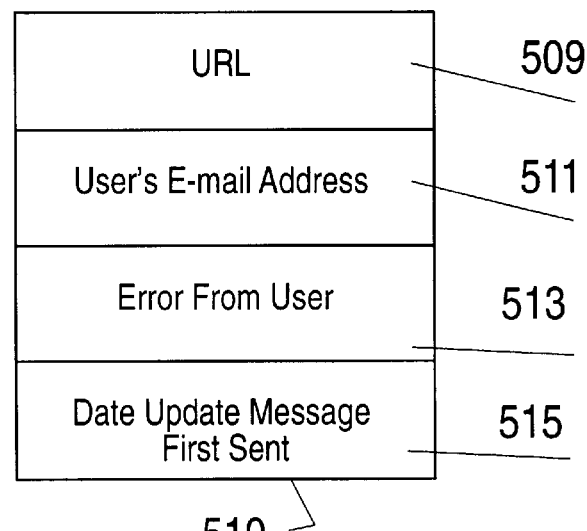

FIG. 5 illustrates the data record structures of the databases used in a preferred embodiment of the invention. The Server's Notification Subscriber database Data Record 500 is used to maintain information relating to users of WWW Browser applications who desire to be notified when a Web Page sufficiently changes. This record 500 is added to the Server's Notification Subscriber database when the WWW Server application receives a notification subscription request (described below for FIG. 8). The record 500 contains a "URL" field 501 that is associated (either contains, or refers directly or indirectly) with a text string that represents the URL of the Web Page being monitored. The "User's E-mail Address" 503 is associated with a text string that represents the recipient's e-mail address where the notification message will be sent when the Web Page sufficiently changes. The "Consecutive Unsuccessful Notification Attempts" field 505 contains a value that indicates the number of unsuccessful attempts made to send a notification message to the e-mail address contained in the "User's E-mail Address" field 503. These unsuccessful attempts are detected because the Internet sends error messages to the originator of undeliverable messages. The "Date of 1st Unsuccessful Attempt" field 507 is initially blank. Once an unsuccessful notification message is received this field 507 receives the current date. Once the "Date of 1st Unsuccessful Attempt" field 507 is non-blank, subsequent unsuccessful notification messages do not update this field 507.

Another data record 510 structure is used in the Server's Contact database. The Server's Contact database is used to make a limited number of attempts to reach the intended recipient of an update message when the update message was undeliverable. The "URL" field 509 is used to determine what URL the user was contacted about. The "URL" field 509 is associated (either contains, or refers directly or indirectly) with a text string that specifies the Web Page for which the subscriber was contacted. The "User's E-mail Address" field 511 is associated with a text string that represents the e-mail address of an intended recipient of a notification message. The "Error From User" field 513 is a boolean field initialized to FALSE. This field 513 is set to TRUE when an error message resulting from unsuccessful delivery of the notification message is received. The "Date Update Message First Sent" field 515 is associated with data that represents the date on which the Update Message was first sent to the intended recipient.

WWW Browser Bookmarking

Figure 6:
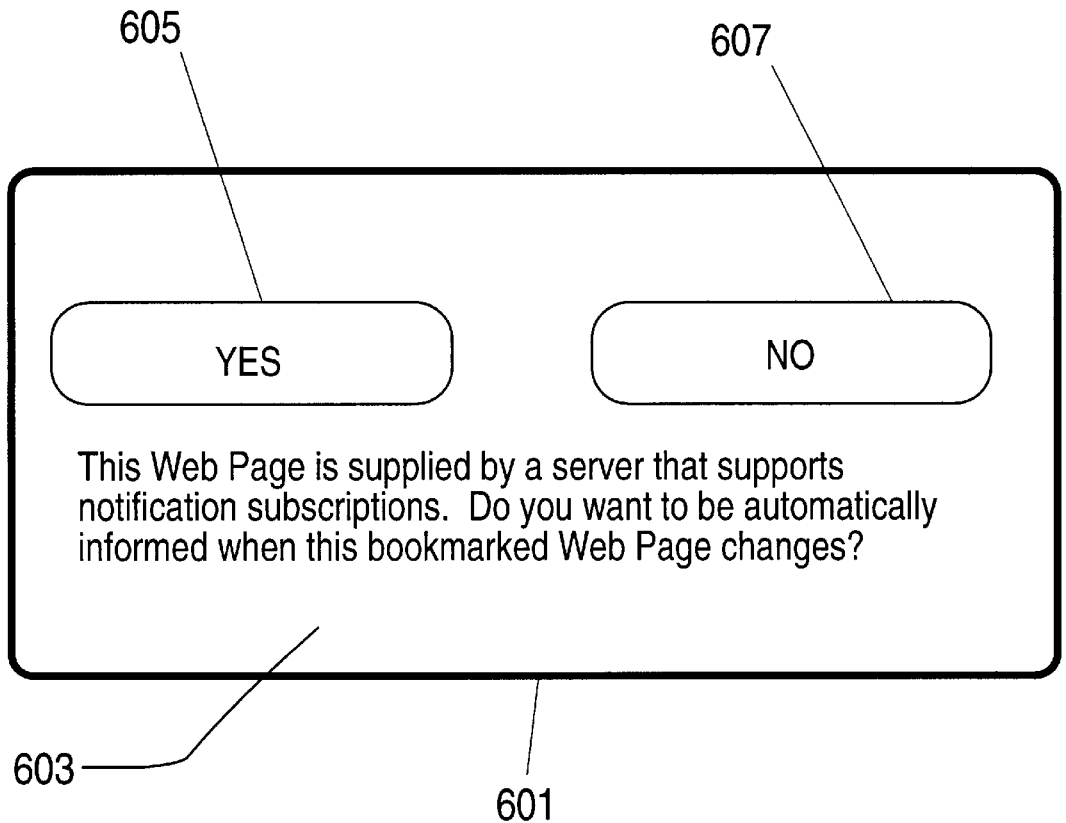
FIG. 6 illustrates a dialog providing the user with the option of requesting notification subscriptions of a Web Page in accordance with a preferred embodiment.

A WWW Browser application incorporating the invention enhances the bookmarking facilities of the prior art. Currently, a WWW Browser application receives a Web Page and displays that Web Page to the user. The user has the capability to bookmark the displayed Web Page. When creating the bookmark, a WWW Browser application using the invention first checks whether the WWW Server application supports a notification mechanism that is capable of supporting change notification and, if so, presents a dialog to the user. An example dialog is shown in FIG. 6. The dialog 601 is presented to the user and contains a message 603 indicating that the WWW Server application supports notification subscriptions. The dialog 603 also contains two buttons 605, 607 that allow the user to respond to the query posed in the message 603. If the user selects the "NO" button 607, the bookmark process continues as in the prior art fashion. Conversely, if the user selects the "YES" button 605 the bookmark process uses the invention.

Figure 7:
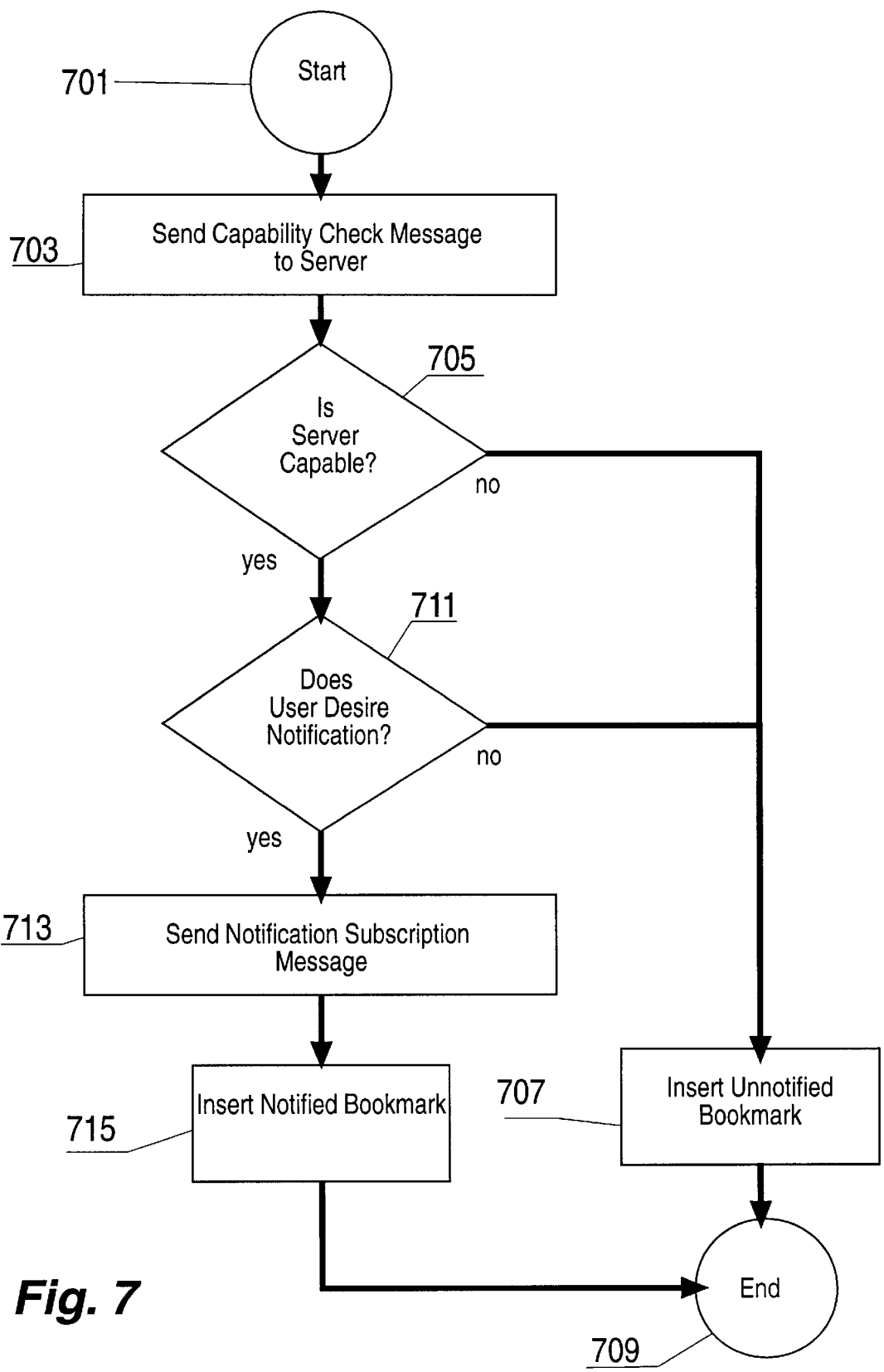
FIG. 7 illustrates a process for requesting notification subscriptions in accordance with a preferred embodiment.

FIG. 7 illustrates this process. The process starts at the terminal labeled as 701. The WWW Browser application first sends 703 a capability check message to the WWW Server application supplying the Web Page being bookmarked. This capability check message determines whether the WWW Server application supports notification subscriptions (that is, whether the WWW Server application is capable). If 705 no response is received within a short time period, such as two or three seconds, or if a negative response is received, the process creates an unnotified bookmark 707 and the process completes through the terminal labeled as 709. This capability check message and corresponding negative and affirmative response are extension-methods in the HTTP protocol that are obvious to one skilled in the art. In a preferred embodiment, the capability check consists of the message:

UPDATE_NOTIFICATION_REQUEST_ACCEPTED HTTP/1.0<CR><LF><CR><LF>

If the WWW Server application did not understand the extension-method, it would respond with a status code of 501 (not implemented). If the WWW Server application did understand the extension-method, it would respond with a status code in the success class (200).

If 705 the WWW Server application is capable, the dialog representative of the one described above for FIG. 6 is displayed to the user. If 711 the user does not desire notification and activates the "NO" button 607, the process creates an unnotified bookmark 707 and the process completes through the terminal labeled as 709. However, if 711 the user activates the "YES" button 605 the process then 713 sends a notification subscription message to the WWW Server application and creates a notified bookmark 715 and the process completes through the terminal labeled as 709.

The notification subscription message contains a keyword that indicates the message is a notification subscription request; the URL of the Web Page being bookmarked; and the user's e-mail address. In a preferred embodiment, the notification subscription message has the form:

UPDATE_NOTIFICATION_REQUEST <URL>HTTP/1.0<CR><LF>

FROM: <user's e-mail address><CR><LF><CR><LF> where <URL> is replaced by the actual URL string identifying the Web Page; and the "<user's e-mail address>" is replaced by the intended recipient's e-mail address.

WWW Server Notification Subscription Processing

Figure 8:
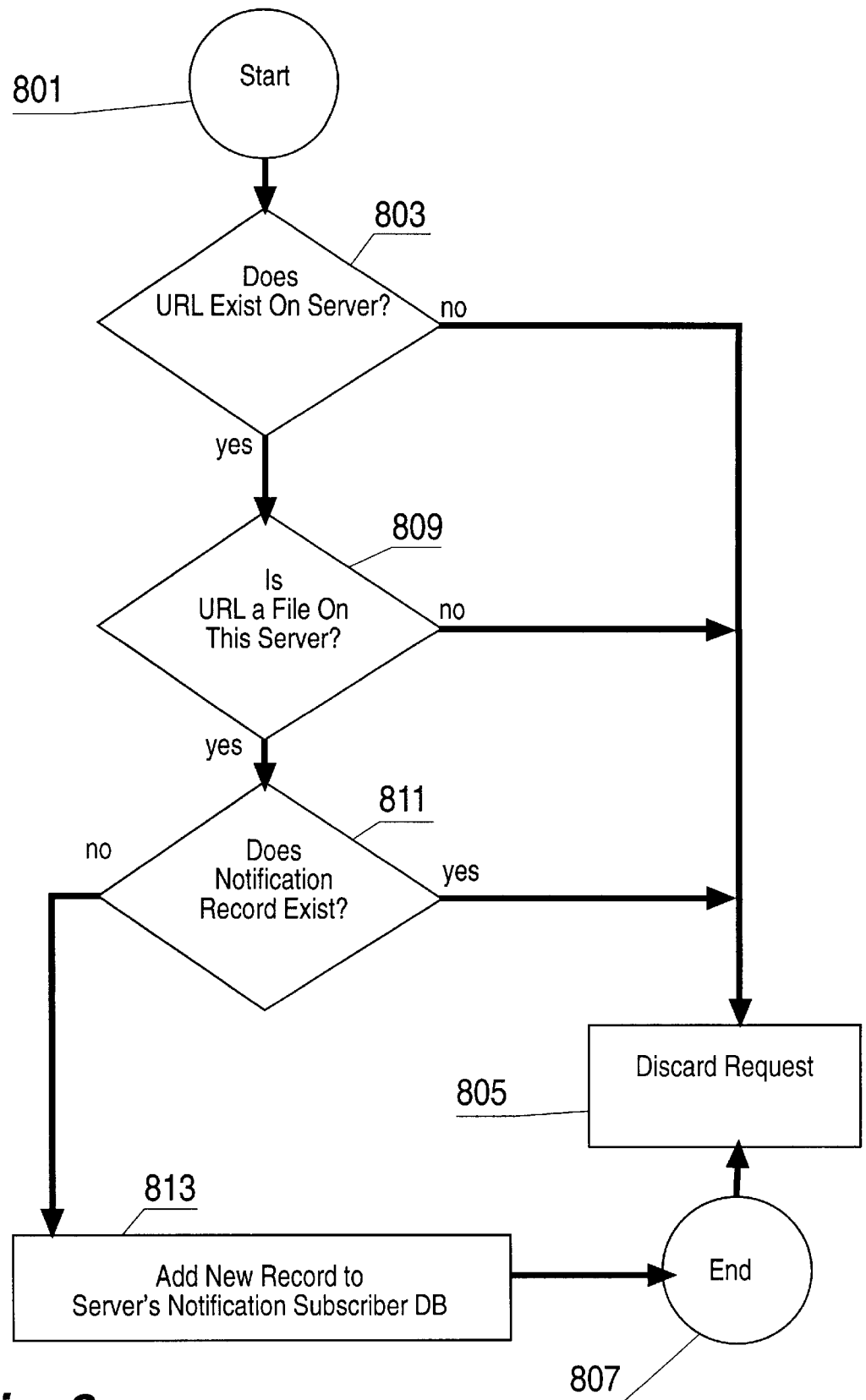
FIG. 8 illustrates an information provider process for responding to a notification subscription request from an information access application in accordance with a preferred embodiment.

FIG. 8 illustrates the process performed by the WWW Server application upon receipt of a notification subscription message from a WWW Browser application. The process starts at the terminal labeled as 801. The process then checks 803 whether the Web Page specified by the URL given in the notification subscription message exists on the Server. If 803 the URL is not accessible to the WWW Server application, the notification subscription message is discarded 805 and the process completes through the terminal labeled as 807.

However, if 803 the URL is available to the WWW Server application, the process then checks 809 whether the URL refers to a Web Page file stored on this WWW Server computer instead of some other service. If 809 the URL does not specify a Web Page file (for example, a the URL may specify a WWW Search engine), the notification subscription message is discarded 805 and the process completes through the terminal labeled as 807.

If 809 the URL specifies a Web Page file, the next check 811 is whether a notification record already exists in the Server's Notification Subscriber database matching the characteristics of the notification subscription message. If 811, the record already exists, the notification subscription message is discarded 805 and the process completes through the terminal labeled as 807. However, if 811 the notification record does not exist, the process then 813 adds a new record 500 to the Server's Notification Subscriber database and the process completes through the terminal labeled as 807.

The record 500 is created by storing the URL from the notification subscription message into the "URL" field 501 of the record 500; storing the originator's e-mail address from the notification subscription message into the "User's E-mail Address" field 503 of the record 500; initializing the "Consecutive Unsuccessful Notification Attempts" field 505 to zero, and initializing the "Date of 1st Unsuccessful Attempt" field 507 to blank.

Server Response to a Modified Web Page File

When the maintainer of a Web Page file has edited the page and has entered the modified Web Page into service the WWW Server application is notified of the change. The server may be notified in any number of ways. In one preferred embodiment, a message is sent to the WWW Server application from the Web Page Development application 221. Other contemplated approaches include extending the capabilities of file transfer programs such as "cp" and "ftp" to provide options for so notifying the server.

Figure 9A:
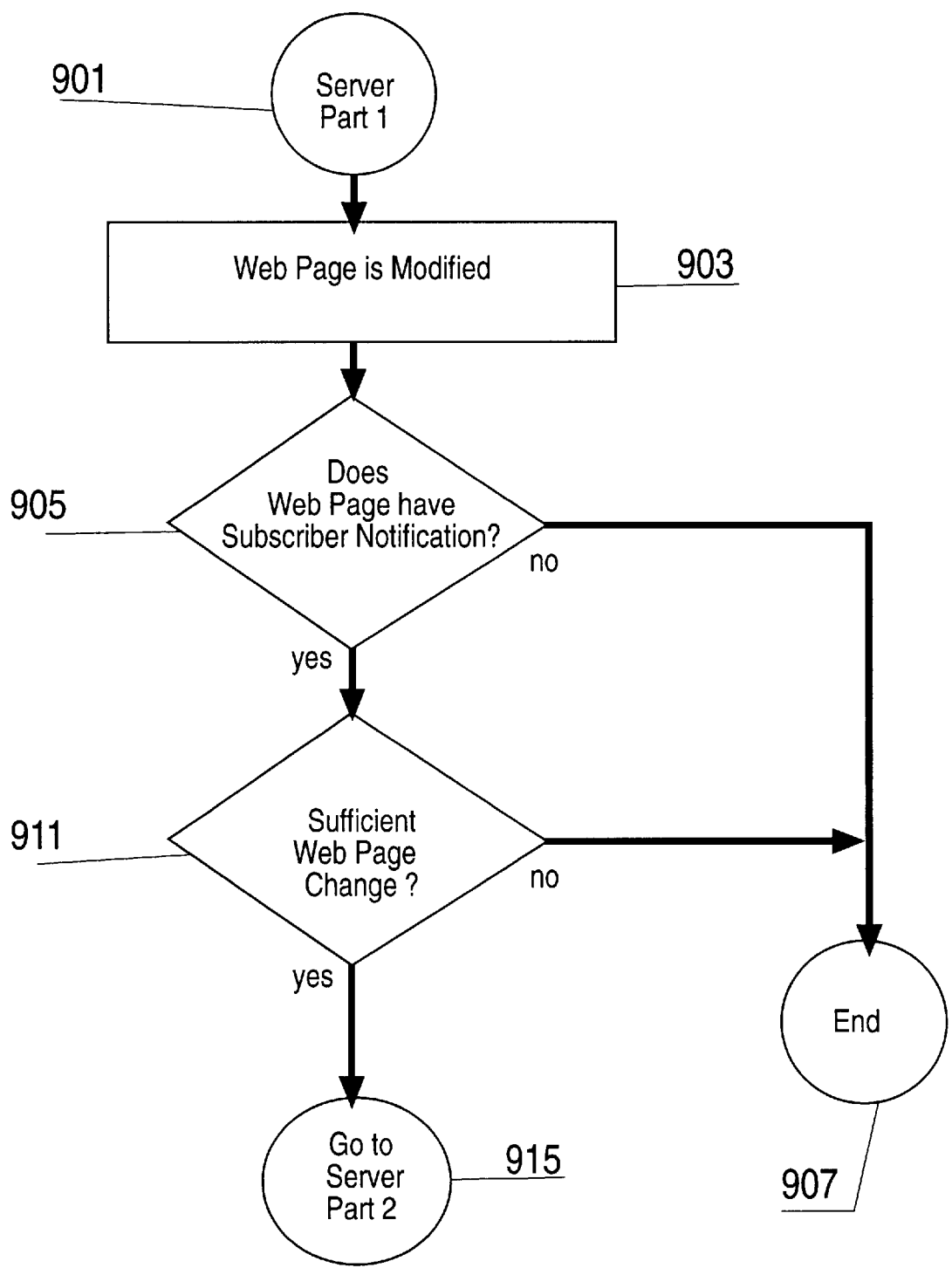
FIGS. 9A & 9B illustrate the process used to notify subscribers of a sufficient modification to a Web Page in accordance with a preferred embodiment.
Figure 9B:
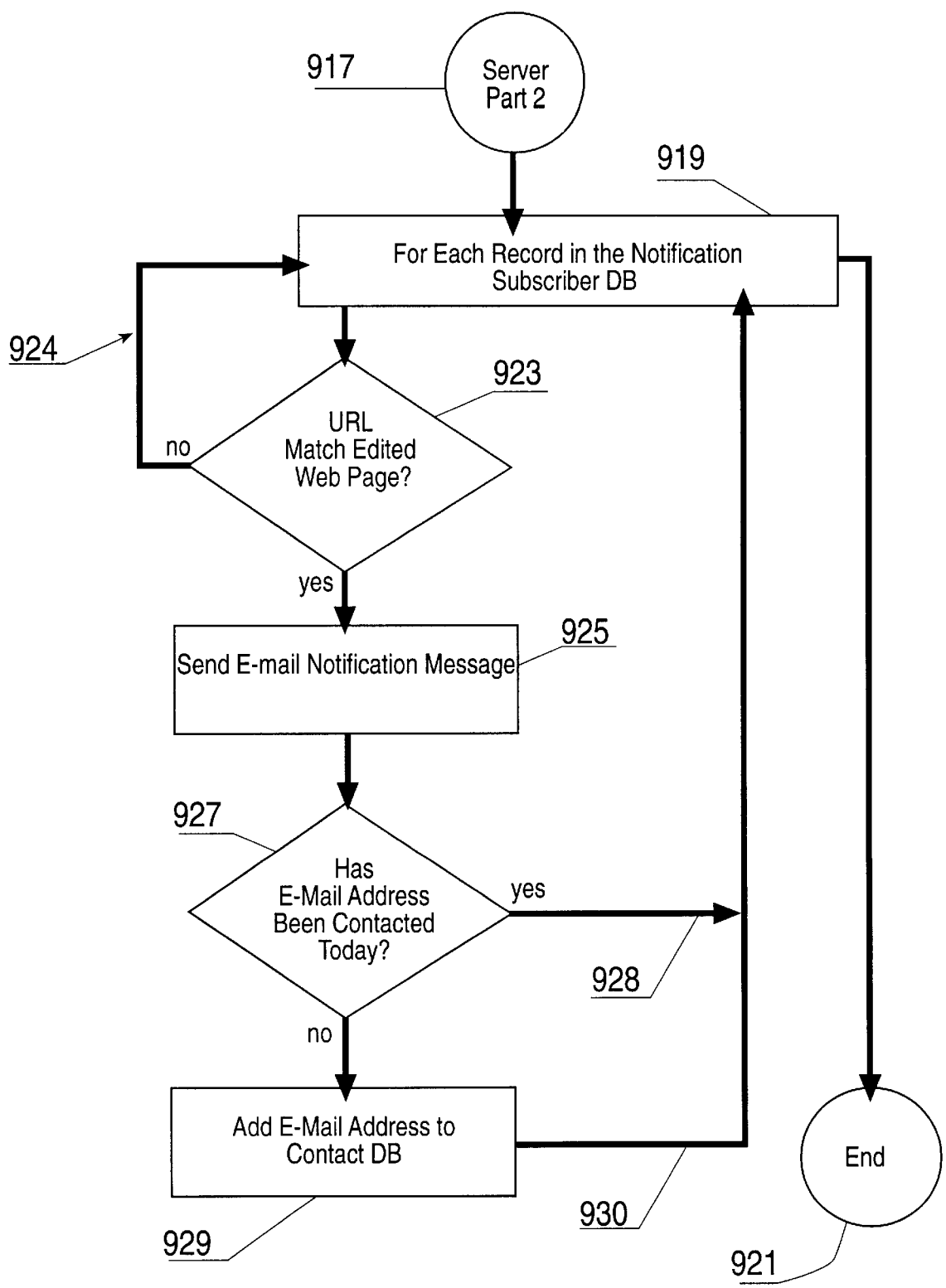

FIGS. 9A and 9B illustrate the process used by the WWW Server application to notify subscribers of a sufficient change to a Web Page. The process starts at the terminal labeled as 901. Once the maintainer of the Web Page has modified 903 the Web Page and submits it to service, the process checks whether the Web Page has any notification subscribers 905. This is accomplished by searching the Server's Notification Subscriber database for a record 500 having a "URL" field 501 matching the URL of the modified page. If no matching record is found 905, the process completes through the terminal labeled as 907. If 905 a match is found, the process then 911 determines whether the maintainer of the Web Page considers the modification to be sufficient. This determination can be accomplished by displaying a dialog to the user, by use of a command line switch or any of a number of equivalent methods well known in the art. If 911 the maintainer does not consider the changes to the Web Page to be sufficient, the process completes through the terminal labeled as 907.

If the maintainer considers the changes to the Web Page to be sufficient 911 (thus initiating the sending of notification messages to all notification subscribers), the process continues through the terminal labeled as 915 to the terminal labeled as 917 of FIG. 9b. Each record 500 of the Server's Notification Subscriber database is examined 919. When all the records 500 in the Server's Notification Subscriber database have been examined, the process completes through the terminal labeled as 921.

Each 919 record 500 in the database is first checked 923 whether the URL of the modified Web Page matches the URL stored in the "URL" field 501 of the record 500. If the URLs do not match, the next record 500 is examined as indicated by the arrow labeled as 924.

If 923 the URLs match, an update notification e-mail message is constructed and sent 925 to the intended recipient's address that is contained in the "User's E-mail Address" field 503 of the record 500. This e-mail message has the form shown in Table 1.

TABLE 1

To: <user's e-mail address>
From: <email address for the notification agent at the server>
Date: <current date and time>
Subject: Web page updated: <URL>
X-Web-Update-Notification: <URL>
The Web Page entitled <pagetitle>
at <URL> has been updated.
To stop getting these update notifications, please simply reply
to this message with the single word
Stop
in the body of the message.

Where "<URL>" is replaced by the actual URL string of the modified Web Page; "<pagetitle>" is replaced by the title of the Web Page as included in the HTML definition of the Web Page; and the "<user's e-mail address>" is replaced by the intended recipient's e-mail address.

Next, if 927 an e-mail message from the WWW Server application addressed to this intended recipient about this URL has previously been sent during the current day, the process continues 919 with the next record 500 as indicated by the arrow labeled as 928. To determine whether e-mail has been sent to this intended recipient during the current day, the Server scans records 510 in the Server's Contact database for any record 510 matching the recipient's e-mail address in the "User's E-mail Address" field 511, the URL in the "URL" field 509 and containing the current date in the "Date Update Message First Sent" field 515.

If 927 the WWW Server application has not already sent e-mail to this recipient on this current date, a record 510 is constructed and added 929 to the Server's Contact database. The "URL" field 509 is initialized to the "URL" field 501 of the current record 500 from the Server's Notification Subscriber database. The "User's E-mail Address" field 511 of this record 510 is initialized to the string of the "User's E-mail Address" field 503 of the current record 500 from the Server's Notification Subscriber database. The "Error From User" field 513 of the record 510 is initialized to FALSE and the "Date Update Message First Sent" field 515 is set to the current date. Finally, the process continues 919 to the next record 500 as indicated by the arrow labeled as 930.

User's E-mail Processing

Figure 10:
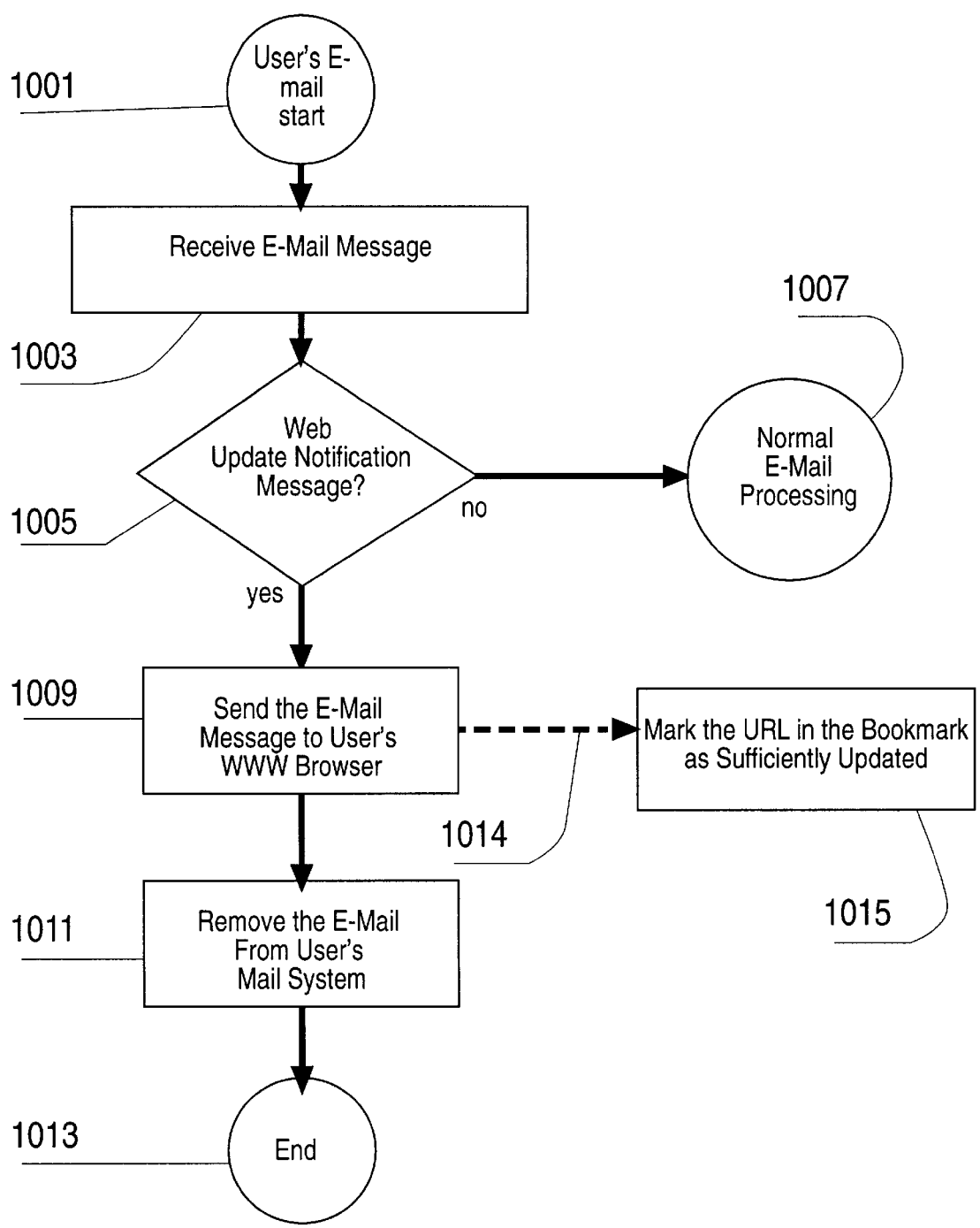
FIG. 10 illustrates how an update notification message is processed in accordance with a preferred embodiment.

FIG. 10 illustrates the method used by the e-mail facility in the recipient's computer to process an update notification message sent from the WWW Server application. The process starts at the terminal labeled as 1001. The e-mail message is received 1003 by the recipient's e-mail facility 201. The recipient's e-mail facility 201 examines the message to determine whether 1005 the message is a Web Update Notification Message as illustrated in Table 1. This determination is performed by examining the header portion of the message for the X-Web-Update-Notification: header. If this header is not contained in the header portion of the message, the e-mail system processes the message in the normal manner as indicated by the terminal labeled as 1007. However 1005, if the message is an update notification message, the process sends 1009 the relevant information to the WWW Browser application as indicated by the dashed arrow labeled as 1014. This communication uses an interprocess communication mechanism such as SUN's ToolTalk, Apple's AppleScript, Microsoft's OLE, TCP/IP or some operating system supported interprocess communication facility. The WWW Browser application processes this information and flags the appropriate bookmark as sufficiently modified. Next 1011, the update notification message is removed from the user's e-mail system so that the user will not view the message. Finally, the process completes through the terminal labeled as 1013.

The data transferred between the e-mail facility 201 and the WWW Browser application 215 using the interprocess communication link 227 comprises: a value that identifies the data as a bookmark update notification; the URL from the field-body of the X-Web-Update-Notification: header; and the date and time value from the field-body of the Date: header.

Terminating Automatic Notification

Figure 11:
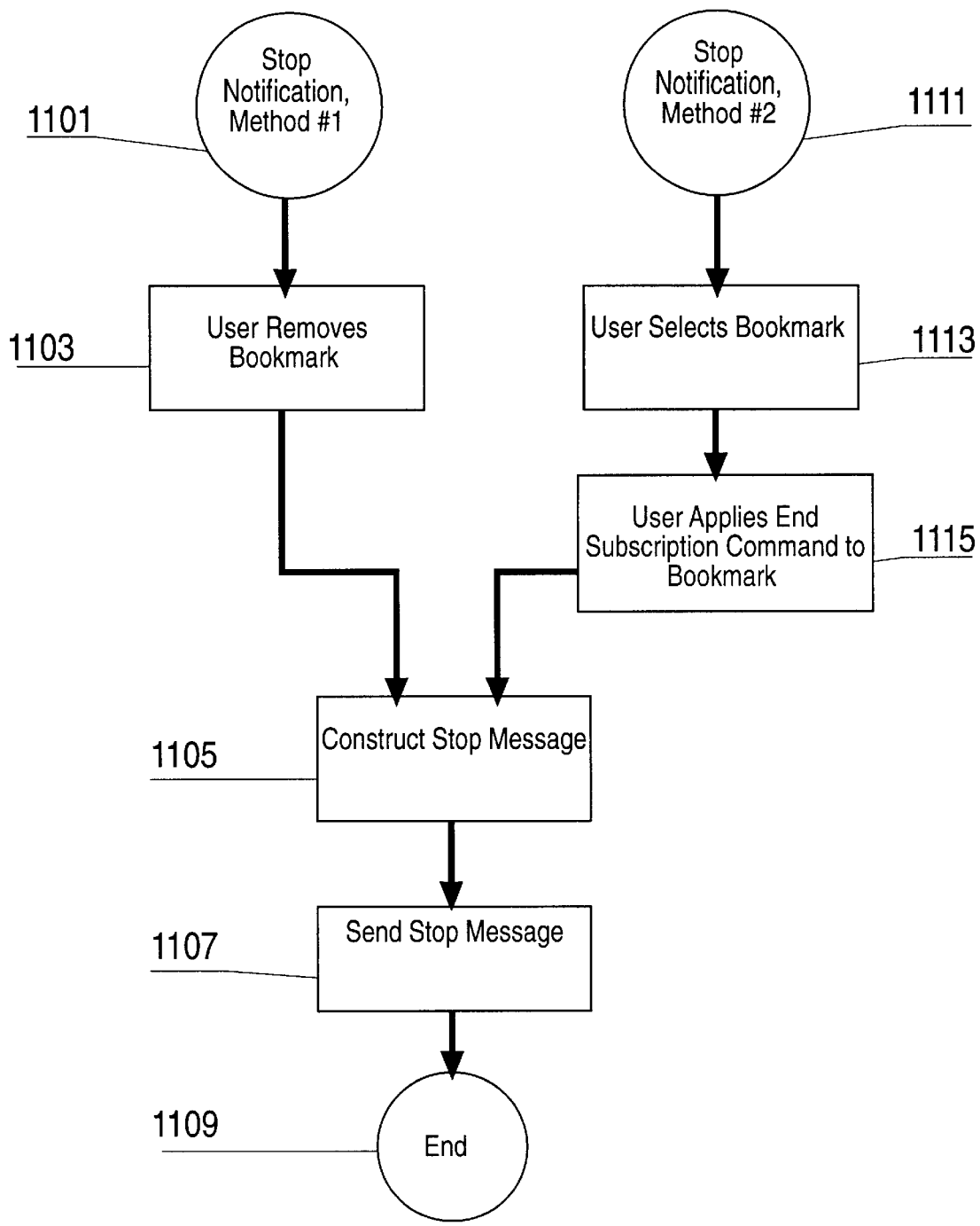
FIG. 11 illustrates how a user unsubscribes from a notification subscription in accordance with a preferred embodiment.

The user of the WWW Browser application will sometimes desire to terminate automatic notification of sufficient Web Page changes. FIG. 11 illustrates two processes that accomplish this. The first process starts at the terminal labeled as 1101. The user removes a Web Page from the bookmarks 1103. Then 1105, the invention constructs a stop message of the form shown in Table 2. Finally 1007, the stop message is sent to the e-mail address of the WWW Server application that provides the newly un-bookmarked Web Page. The process completes through the terminal labeled as 1109.

A second removal process that retains the bookmark but removes the update notification from the bookmark starts at the terminal labeled as 1111. For this process, the user applies 1115 a command to a particular bookmark 1113 to terminate the notification subscription for that bookmark. Then 1105 the invention constructs a stop message of the form shown in Table 2. Next 1007, the stop message is sent to the e-mail address of the WWW Server application that supplies the bookmarked Web Page. Finally, the process completes through the terminal labeled as 1109.

TABLE 2

Figure 12A:
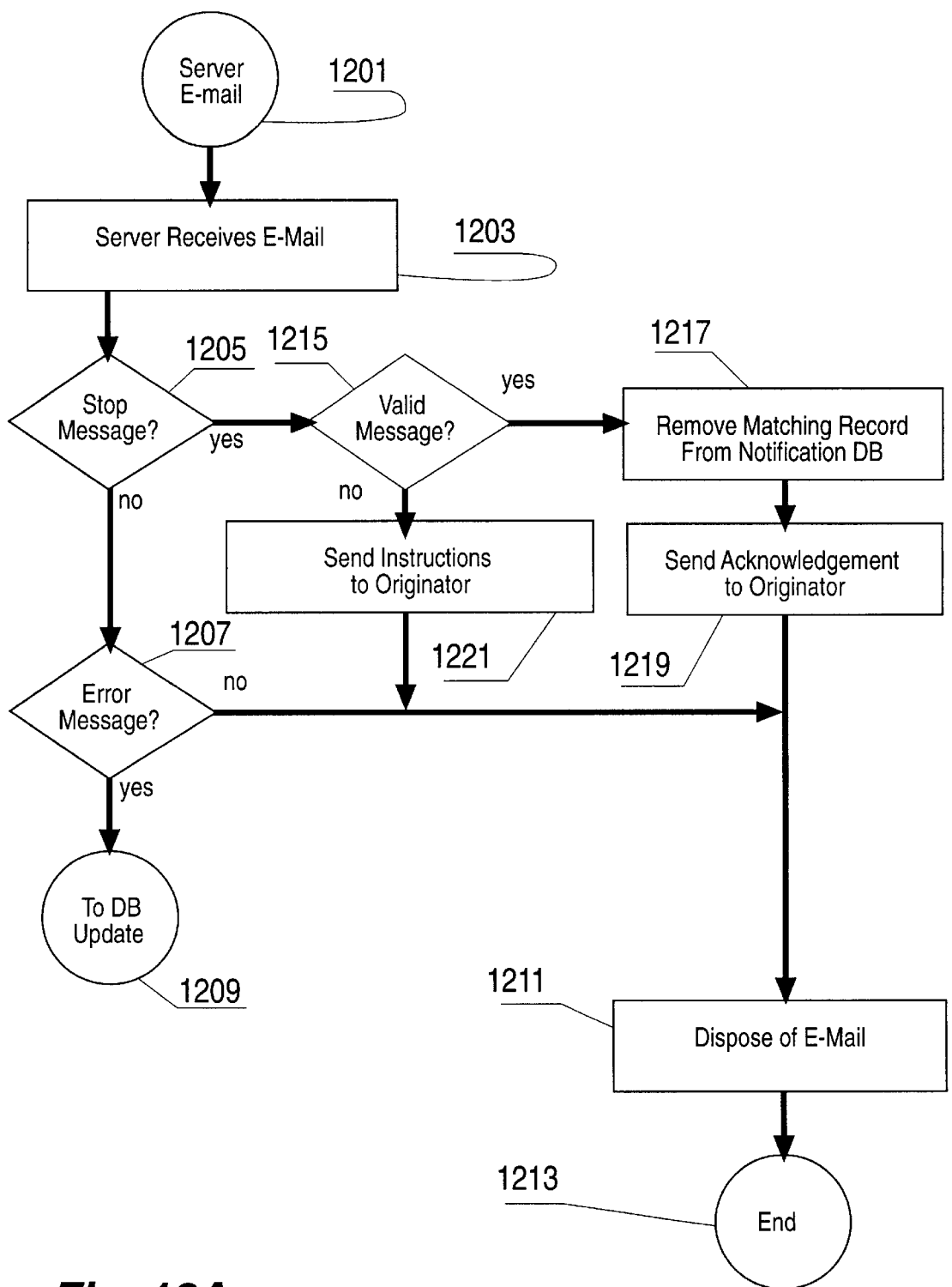
FIGS. 12A & 12B illustrate how an information provider application processes stop and error e-mail messages in accordance with a preferred embodiment.

To: <email address for the notification agent at the server>
From: <user's e-mail address>
Date: <current date and time>
Subject: Re: Web page updated: <URL>
Stop Server's E-mail Processing As mentioned above, a user can terminate the subscription to update notices. The user who desires to terminate the subscription process causes a "stop" e-mail message to be sent to the WWW Server application that sources the Web Page. Additionally, because the WWW Server application sends notification e-mail messages to intended recipients who subscribe to the update service, the WWW Server application may receive messages indicating unsuccessful delivery of the notification e-mail messages. FIG. 12A illustrates the WWW Server application's process for processing these e-mail messages. The process starts at the terminal labeled as 1201. The WWW Server application receives 1203 an e-mail message from the WWW Server computer's e-mail facility. The WWW Server application then 1205 examines the message to determine whether the message is a stop message as described above (see Table 2).

If 1205 the e-mail message is not a stop message, the message is examined 1207 to determine whether the message indicates unsuccessful delivery of an update notification message sent from this WWW Server application. If 1207 the message is such an error message the process continues through the terminal labeled as 1209 to the terminal labeled as 1231 of FIG. 12B. If 1207 the message is not such an error message, the e-mail message is removed 1211 from the system, and the process completes through the terminal labeled as 1213.

If 1205 the message is a stop message, it is checked 1215 for validity. This validity check assures that the field-body for the Subject: field contains a URL. Furthermore, the validity check assures that the Server's Notification Subscriber database contains a record with "URL" 501 and "User's E-mail Address" 503 fields containing data that match the <URL> from the Subject: field-body and <user's e-mail address> contained in the field-body of the From: header. If 1215 the message is valid, the corresponding record is removed 1217 from the Server's Notification Subscriber database—thus ending the user's subscription. Next 1219, an acknowledgment message (similar to the template shown in Table 3) is constructed and sent to the e-mail address specified in the field-body of the From: header of the termination e-mail message. Finally 1211, the termination message is removed and the process completes through the terminal labeled as 1213.

TABLE 3

To: <user's e-mail address>
From: <email address for the notification agent at the server>
Date: <current date and time>
Subject: Web page update notification terminated: <URL>
Update notification for the Web Page entitled <pagetitle>
at <URL> has been terminated.

If 1215 the message is not a valid termination message, the WWW Server application constructs and sends 1221 an instructional message (similar to the template shown in Table 4) to the originator of the defective termination message. Finally 1211, the termination message is removed and the process completes through the terminal labeled as 1213.

TABLE 4

To: <user's e-mail address>
From: <email address for the notification agent at the server>
Date: <current date and time>
Subject: <URL>
To terminate notification subscription of a Web Page, reply to this message with the single word
Stop
in the body of the message.

Figure 12B:
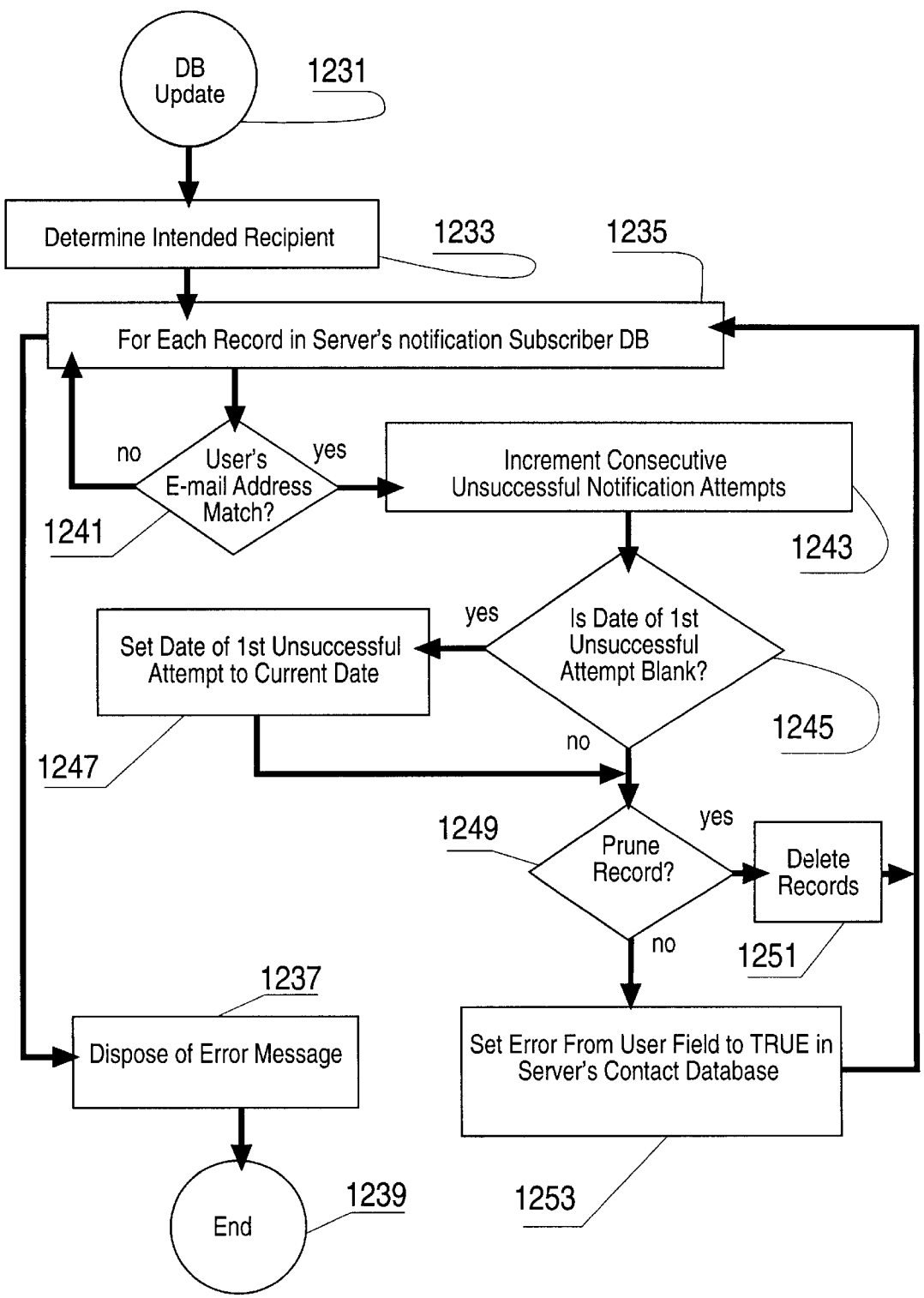

As mentioned above, if 1207 an error message is received processing continues from the terminal labeled as 1209 in FIG. 12A to the terminal labeled as 1231 in FIG. 12b. The process evaluates the error message to determine 1233 the intended recipient. Then 1235, each record 500 in the Server's Notification Subscriber database is examined. Once all the records 500 in the database are examined, the process disposes 1237 of the error message and completes through the terminal labeled as 1239.

If 1241 the "User's E-mail Address" field 503 of the record 500 being examined does not match the e-mail address of the intended recipient the next 1235 is examined. However, if 1241 there is a match, the process 1243 increments the "Consecutive Unsuccessful Notification Attempts" field 1243 of the record 500. Next, if 1245 the "Date of 1st Unsuccessful Attempt" field 507 is blank, it is set 1247 to the current date. Otherwise if 1245 the "Date of 1st Unsuccessful Attempt" field 507 is not blank the field 507 is left unchanged. Next 1249, the process checks (as described below) whether the record 500 should be pruned from the Server's Notification Subscriber database. If 1249 the record 500 is not pruned, the process then 1253 sets the "Error From User" field 513 in the Server's Contact database record 510 for the corresponding message (matching the "URL" 509 and "User's E-mail Address" 511 fields of the Server's Contact database record 510) with information extracted from the error message. Finally 1235, the next record 500 is examined.

To determine whether 1249 the record 500 is to be pruned, the process determines whether the "Consecutive Unsuccessful Notification Attempts" field 505 has exceeded a predetermined value and the "Date of 1st Unsuccessful Attempt" field 507 indicates that a sufficient interval has passed. In a preferred embodiment, the predetermined value above is five and the interval is a week. If 1249 the record 500 is pruned, that record 500 is deleted 1251 along with any corresponding records 510 in the Server's Contact database. Finally 1235, the next record 500 is examined.

Figure 13:
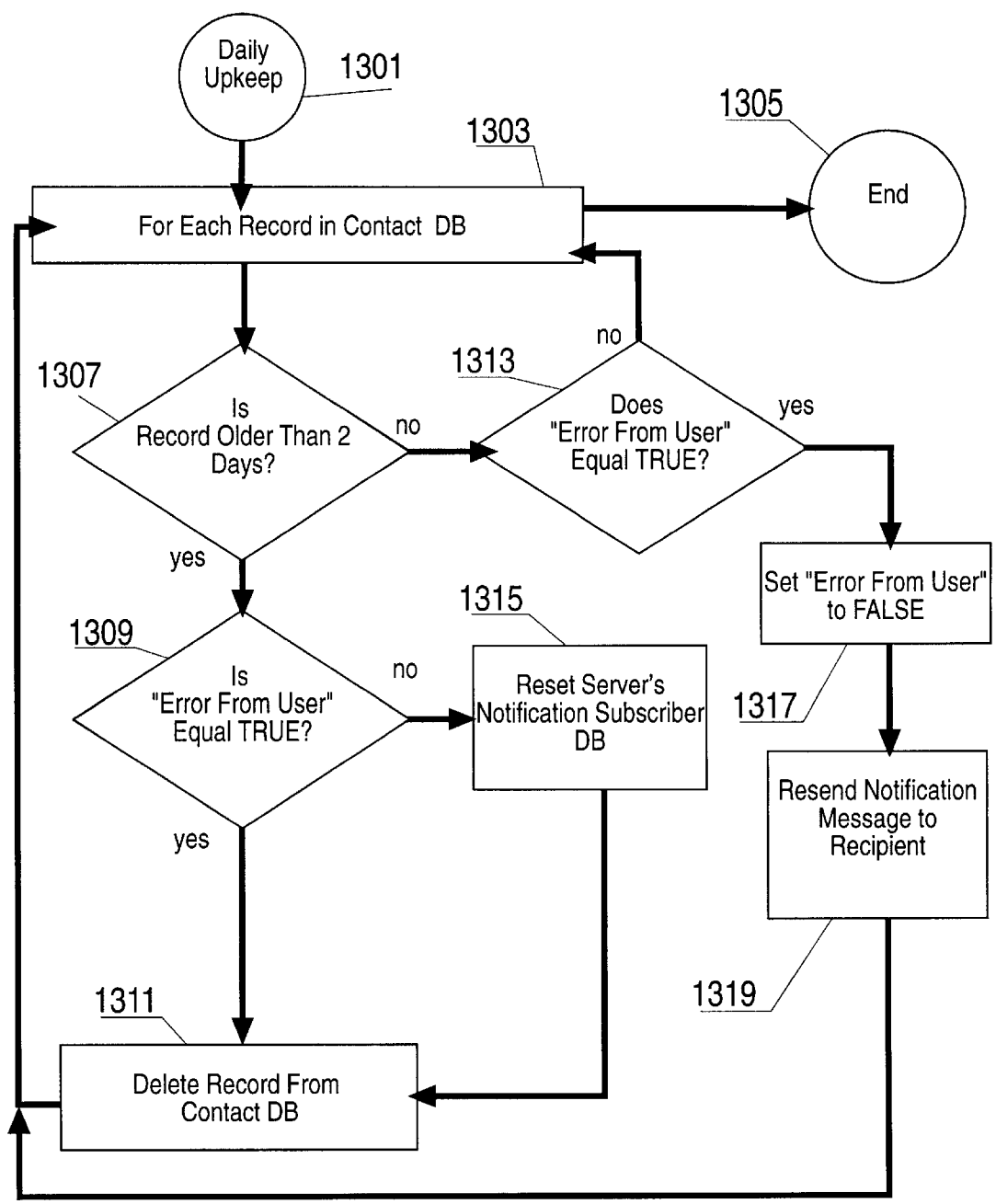
FIG. 13 illustrates daily database maintenance and re-transmission processes used in accordance with a preferred embodiment.

FIG. 13 illustrates the process used to maintain the Server's Contact database and to resend update notification e-mail messages that have triggered an unsuccessful delivery error message. This process is performed once a day generally during a period of low computer activity. The process starts at the terminal labeled as 1301. Each record 510 in the Server's contact database is processed 1303. After all records 510 in the database have been accessed the process completes through the terminal labeled as 1305. The first test performed on each record 510 is whether the record 510 is older than two days. One skilled in the art will understand that the two day restriction is used to limit the number of retry attempts and that this restriction can be adjusted to meet the needs of a particular embodiment of the invention. If 1307 the record is older than two days, the process then determines whether 1309 the last message sent to the recipient triggered an unsuccessful delivery error message. This is determined by examining the state of the "Error From User" field 513 in the record 510. If this field 513 has not been set to TRUE (from FIG. 12B), the record 510 is deleted from the Server's contact database 1311 and the process continues 1303 with the next record 510.

If 1307 the record 510 is not older than two days, the process also determines whether 1313 the last message sent to the recipient triggered an unsuccessful delivery error message. This is determined by examining the state of the "Error From User" field 513 in the record 510. If this field 513 has not been set to TRUE (from FIG. 12b), the process continues 1303 with the next record 510. If 1313 the field 513 is set to TRUE the field 513 is reset to FALSE 1317 and another update notification message is constructed and sent 1319 to the recipient specified by the "User's E-mail Address" field 511. Then the process continues 1303 with the next record 510.

If 1309 a record 510 older than two days contains a FALSE in the "Error From User" field 513, the process then resets 1315 the Server's Notification Subscriber database and deletes 1311 the record 510 from the Server's Contact database. To reset 1315 the Server's Notification Subscriber database, the process locates a record 500 in the Server's Notification Subscriber database that has the same data in the "URL" field 501 and "User's E-mail Address" field 503 as the data in the "URL" field 509 and "User's E-mail Address" field 511 respectively of the current contact database record 510. Then the process zeros the "Consecutive Unsuccessful Notification Attempts" field 505, and sets the "Date of 1st Unsuccessful Attempt" field 507 to blank. Finally, the record 510 is deleted from the Server's contact database 1311 and the process continues 1303 with the next record 510.

Conclusion

One skilled in the art will understand that the invention as described above teaches a computerized system that provides additional functionality to the bookmark facility of WWW Browser computer applications and other information access apparatus.

Further, one skilled in the art will understand that various modifications and alterations may be made in the preferred embodiment disclosed herein without departing from the scope of the invention. Accordingly, the scope of the invention is not to be limited to the particular invention embodiments discussed above, but should be defined only by the claims set forth below and equivalents thereof.

What is claimed is:

1. A computer controlled method for automatically indicating when an information file has sufficiently changed; said information file provided to an information access apparatus that includes a client computer executing a browser application, and a bookmark mechanism for storing an information file specification; said method comprising the steps of said information access apparatus:

(a) sending a subscription message containing said information file specification to a notification mechanism included within an information provider apparatus that comprises a server computer executing a server application;

(b) receiving, from said notification mechanism, a notification message providing notice that said information file has sufficiently changed; said notification message initiated by one who maintains said information file; and (c) indicating that said information file has sufficiently changed.

2. The computer controlled method of claim 1 further comprising the step of:

(d) sending a stop message containing said information file specification to said notification mechanism.

3. The computer controlled method of claim 1 wherein said information file is provided by said information provider apparatus.

4. The computer controlled method of claim 3 wherein said information file is a web page and said information file specification is a universal resource locator.

5. The computer controlled method of claim 3 further comprising the steps of said information provider apparatus:

(d) receiving said subscription message containing said information file specification;

(e) adding said information file specification to a database; and (f) sending said notification message in response to a sufficient change in said information file.

6. The computer controlled method of claim 5 further comprising the steps of said information provider apparatus:

(g) receiving a stop message containing said information file specification; and (h) deleting said information file specification from said database.

7. The computer controlled method of claim 5 further comprising the steps of said information provider apparatus:

(g) receiving an error message indicating unsuccessful delivery of said notification message; and (h) resending said notification message.

8. The computer controlled method of claim 5 further comprising the steps of said information provider apparatus:

(g) receiving an error message indicating unsuccessful delivery of said notification message; and (h) deleting said information file specification from said database.

9. An information access system including a client computer executing a browser application, and a bookmark mechanism for storing an information file specification; said information access system comprising:

a subscription mechanism configured to send a subscription message containing said information file specification to a notification mechanism included within an information provider apparatus comprising a server computer executing a server application;

a notification message receiver mechanism configured to receive a notification message sent from said notification mechanism; said notification message providing notice that an information file sufficiently changed; said notification message initiated by one who maintains said information file; and an indication mechanism configured to indicate that said information file has sufficiently changed; said indication mechanism coupled to said subscription mechanism and responsive to said notification message receiver mechanism.

10. The information access system of claim 9 further comprising a subscription termination mechanism configured to send a stop message containing said information file specification to said notification mechanism.

11. The information access system of claim 9 wherein said information file is provided by said information provider apparatus.

12. The information access system of claim 11 wherein said information file is a web page and said information file specification is a universal resource locator.

13. The information access system of claim 11 further comprising:

a first receiving mechanism configured to receive said subscription message containing said information file specification;

a first database mechanism configured to add said information file specification to a database; and a sending mechanism configured to send said notification message in response to a sufficient change in said information file.

14. The information access system of claim 13 further comprising:

a second receiving mechanism configured to receive a stop message containing said information file specification; and a second database mechanism configured to delete said information file specification from said database.

15. The information access system of claim 13 further comprising:

a second receiving mechanism configured to receive an error message indicating unsuccessful delivery of said notification message; and a resend mechanism configured to send said notification message.

16. The information access system of claim 13 further comprising:

a second receiving mechanism configured to receive an error message indicating unsuccessful delivery of said notification message; and a second database mechanism configured to delete said information file specification from said database.

17. An information access apparatus for accessing an information file having a central processing unit (CPU), a memory, a network interface to provide access to a network, and a display device; said information access apparatus executing a browser application, and utilizing a bookmark mechanism for storing an information file specification identifying said information file; said information access apparatus comprising:

a subscription mechanism configured to send a subscription message containing said information file specification to a notification mechanism included within an information provider apparatus comprising a server computer executing a server application;

a notification message receiver mechanism configured to receive a notification message sent from said notification mechanism; said notification message providing notice that said information file sufficiently changed; said notification message initiated by one who maintains said information file; and an indication mechanism configured to indicate that said information file has sufficiently changed; said indication mechanism coupled to said subscription mechanism and responsive to said notification message receiver mechanism.

18. The information access apparatus of claim 17 wherein said information file is a web page and said information file specification is a universal resource locator.

19. The information access apparatus of claim 17 further comprising a subscription termination mechanism configured to send a stop message containing said information file specification to said notification mechanism.

20. A computer program product comprising:
a computer usable storage medium having computer readable code embodied therein for causing a computer to access an information file; said computer readable code comprising:
computer readable program code devices configured to cause said computer to effect an information access apparatus configured to use an information file specification to access said information file; said information access apparatus configured to affect a browser mechanism, and a bookmark mechanism for storing said information file specification;
computer readable program code devices configured to cause said computer to effect a subscription mechanism configured to send a subscription message containing said information file specification to a notification mechanism included within an information provider apparatus comprising a server computer executing a server application;
computer readable program code devices configured to cause said computer to effect a notification message receiver mechanism configured to receive a notification message sent from said notification mechanism; said notification message providing notice that said information file has sufficiently changed; said notification message initiated by one who maintains said information file; and
computer readable program code devices configured to cause said computer to effect an indication mechanism configured to indicate that said information file has sufficiently changed; said indication mechanism coupled to said subscription mechanism and responsive to said notification message receiver mechanism.

21. The computer program product of claim 20 wherein said information file is a web page and said information file specification is a universal resource locator.

22. The computer program product of claim 20 further comprising computer readable program code devices configured to cause said computer to effect a subscription termination mechanism configured to send a stop message containing said information file specification to said notification mechanism.

23. An information provider apparatus configured as a world wide web server, for providing an information file identified by an information file specification; said information provider apparatus having a central processing unit (CPU), a memory, and a network interface to provide access to a network; said information provider apparatus comprising:
a first receiving mechanism configured to receive a subscription message containing said information file specification and an e-mail address;
a first database mechanism configured to add said information file specification and said e-mail address to a database responsive to said first receiving mechanism; and a sending mechanism configured to send a notification message in response to a sufficient change in said information file to said e-mail address; said sufficient change determined and said notification message initiated by one who maintains said information file.

24. The information provider apparatus of claim 23 further comprising:
a second receiving mechanism configured to receive a stop message containing said information file specification; and
a second database mechanism configured to delete said information file specification from said database.

25. The information provider apparatus of claim 23 further comprising:
a second receiving mechanism configured to receive an error message indicating unsuccessful delivery of said notification message; and
a resend mechanism configured to send said notification message.

26. The information provider apparatus of claim 23 further comprising:
a second receiving mechanism configured to receive an error message indicating unsuccessful delivery of said notification message; and
a second database mechanism configured to delete said information file specification from said database.

27. A computer program product comprising:
a computer usable storage medium having computer readable code embodied therein for causing a computer to provide an information file; said computer readable code comprising:
computer readable program code devices configured to cause a server computer to effect an information provider apparatus configured to use an information file specification to provide said information file;
computer readable program code devices configured to cause said computer to effect a first receiving mechanism configured to receive a subscription message containing said information file specification and an e-mail address;
computer readable program code devices configured to cause said computer to effect a first database mechanism configured to add said information file specification and said e-mail address to a database responsive to said first receiving mechanism; and
computer readable program code devices configured to cause said computer to effect a sending mechanism configured to send a notification message in response to a sufficient change in said information file to said e-mail address; said sufficient change determined and said notification message initiated by one who maintains said information file.

28. The information provider apparatus of claim 27 further comprising:
computer readable program code devices configured to cause said computer to effect a second receiving mechanism configured to receive a stop message containing said information file specification; and
computer readable program code devices configured to cause said computer to effect a second database mechanism configured to delete said information file specification from said database.

29. The information provider apparatus of claim 27 further comprising:
computer readable program code devices configured to cause said computer to effect a second receiving mechanism configured to receive an error message indicating unsuccessful delivery of said notification message; and computer readable program code devices configured to cause said computer to effect a resend mechanism configured to send said notification message.

30. The information provider apparatus of claim 27 further comprising:

computer readable program code devices configured to cause said computer to effect a second receiving mechanism configured to receive an error message indicating unsuccessful delivery of said notification message; and computer readable program code devices configured to cause said computer to effect a second database mechanism configured to delete said information file specification from said database.

\* \* \* \* \*